US012739892B2

(12) United States Patent
Chiarello et al.

(10) Patent No.: US 12,739,892 B2
(45) Date of Patent: Sep. 15, 2026

(54) METHODS FOR PRACH OCCASION INDEXING AND RO GROUPS DETERMINATION

(71) Applicant: Nokia Technologies Oy, Espoo (FI)

(72) Inventors: Leonardo Chiarello, Munich (DE); Alessio Marcone, Munich (DE); Marco Maso, Issy les Moulineaux (FR); Nhat-Quang Nhan, Reims (FR)

(73) Assignee: Nokia Technologies Oy, Espoo (FI)

( * ) Notice: Subject to any disclaimer, the term of this patent is extended or adjusted under 35 U.S.C. 154(b) by 216 days.

(21) Appl. No.: 18/664,424

(22) Filed: May 15, 2024

(65) Prior Publication Data

US 2024/0389155 A1 Nov. 21, 2024

Related U.S. Application Data

(60) Provisional application No. 63/466,505, filed on May 15, 2023.

(51) Int. Cl.
*H04W 74/0833* (2024.01)

(52) U.S. Cl.
CPC .............................. *H04W 74/0833* (2013.01)

(58) Field of Classification Search
None
See application file for complete search history.

(56) References Cited

U.S. PATENT DOCUMENTS

| | | | | |
|---|---|---|---|---|
| 2018/0007548 | A1* | 1/2018 | Jover | H04K 3/25 |
| 2019/0350010 | A1* | 11/2019 | Guo | H04W 74/0833 |
| 2021/0266982 | A1* | 8/2021 | Guo | H04W 74/0833 |
| 2022/0022268 | A1* | 1/2022 | Shen | H04L 5/0051 |
| 2026/0067782 | A1* | 3/2026 | Adjakple | H04W 36/362 |

FOREIGN PATENT DOCUMENTS

| | | |
|---|---|---|
| WO | 2024/061790 A1 | 3/2024 |

OTHER PUBLICATIONS

"3rd Generation Partnership Project; Technical Specification Group Radio Access Network; NR; Physical channels and modulation (Release 17)", 3GPP TS 38.211 V17.4.0, Dec. 2022, pp. 1-136.
"3rd Generation Partnership Project; Technical Specification Group Radio Access Network; NR; Physical layer procedures for control (Release 17)", 3GPP TS 38.213 V17.5.0, Mar. 2023, pp. 1-262.

(Continued)

*Primary Examiner* — Phirin Sam
(74) *Attorney, Agent, or Firm* — Barta Jones, PLLC

(57) ABSTRACT

A method including receiving, from a network device, configuration information for random access, wherein the configuration information comprises parameters for determining a plurality of random access channel occasions and for mapping the plurality of random access channel occasions with one or more of a plurality of synchronization signal block indices; indexing the plurality of random access channel occasions; grouping the plurality of random access channel occasions into one or more random access channel occasion groups based on the indexing; and transmitting, to the network device, a plurality of physical random access channel transmissions using at least one of the one or more random access channel occasion groups.

20 Claims, 6 Drawing Sheets

(56) References Cited

OTHER PUBLICATIONS

"New WI: Further NR coverage enhancements", 3GPP TSG RAN Meeting #94e, RP-213579, China Telecom, Agenda Item: 8.6.1, Dec. 6-17, 2021, 5 pages.
"3rd Generation Partnership Project; Technical Specification Group Radio Access Network; NR; Radio Resource Control (RRC) protocol specification (Release 17)", 3GPP TS 38.331 V17.4.0, Mar. 2023, pp. 1-1324.
Extended European Search Report received for corresponding European Patent Application No. 24172436.8, dated Oct. 23, 2024, 8 pages.
"Discussion on PRACH coverage enhancement", 3GPP TSG RAN WG1 #112bis-e, R1-2303034, China Telecom, Agenda item: 9.12.1, Apr. 17-26, 2023, 14 pages.
"PRACH coverage enhancements", 3GPP TSG RAN WG1 #112-bis-e, R1-2302880, Nokia, Agenda item: 9.12.1, Apr. 17-26, 2023, 24 pages.

* cited by examiner

METHODS FOR PRACH OCCASION INDEXING AND RO GROUPS DETERMINATION

TECHNICAL FIELD

The example and non-limiting embodiments relate generally to multiple random access channel transmissions and, more particularly, to random access channel occasions.

BRIEF DESCRIPTION OF PRIOR DEVELOPMENTS

Multiple physical random access channel (PRACH) transmissions are known, and sometimes referred to as PRACH repetitions. A PRACH transmission may be sent by a user equipment at one or more occasions.

SUMMARY OF THE INVENTION

The following summary is merely intended to be an example. The summary is not intended to limit the scope of the claims.

In accordance with one aspect, an example method is provided comprising: receiving, from a network device, configuration information for random access, wherein the configuration information comprises parameters for determining a plurality of random access channel occasions and for mapping the plurality of random access channel occasions with one or more of a plurality of synchronization signal block indices; indexing the plurality of random access channel occasions; grouping the plurality of random access channel occasions into one or more random access channel occasion groups based on the indexing; and transmitting, to the network device, a plurality of physical random access channel transmissions using at least one of the one or more random access channel occasion groups.

In accordance with one aspect, an example method is provided comprising: indexing physical random access channel resources; determining grouping of the physical random access channel resources based, at least partially, upon the indexing; and transmitting a physical random access channel transmission using the determined grouping.

In accordance with one aspect, an example apparatus is provided comprising: at least one processor; and at least one non-transitory memory storing instructions that, when executed with the at least one processor, cause the apparatus to perform: receiving, from a network device, configuration information for random access, wherein the configuration information comprises parameters for determining a plurality of random access channel occasions and for mapping the plurality of random access channel occasions with one or more of a plurality of synchronization signal block indices; indexing the plurality of random access channel occasions; grouping the plurality of random access channel occasions into one or more random access channel occasion groups based on the indexing; and transmitting, to the network device, a plurality of physical random access channel transmissions using at least one of the one or more random access channel occasion groups.

In accordance with one aspect, an example apparatus is provided comprising: means for receiving, from a network device, configuration information for random access, wherein the configuration information comprises parameters for determining a plurality of random access channel occasions and for mapping the plurality of random access channel occasions with one or more of a plurality of synchronization signal block indices; means for indexing the plurality of random access channel occasions; means for grouping the plurality of random access channel occasions into one or more random access channel occasion groups based on the indexing; and means for transmitting, to the network device, a plurality of physical random access channel transmissions using at least one of the one or more random access channel occasion groups.

In accordance with one aspect, an example non-transitory program storage device readable by an apparatus is provided, tangibly embodying a program of instructions executable with the apparatus for performing operations, the operations comprising: receiving, from a network device, configuration information for random access, wherein the configuration information comprises parameters for determining a plurality of random access channel occasions and for mapping the plurality of random access channel occasions with one or more of a plurality of synchronization signal block indices; indexing the plurality of random access channel occasions; grouping the plurality of random access channel occasions into one or more random access channel occasion groups based on the indexing; and transmitting, to the network device, a plurality of physical random access channel transmissions using at least one of the one or more random access channel occasion groups.

In accordance with one aspect, an example apparatus is provided comprising: at least one processor; and at least one non-transitory memory storing instructions that, when executed with the at least one processor, cause the apparatus to perform: indexing physical random access channel resources; determining grouping of the physical random access channel resources based, at least partially, upon the indexing; and transmitting a physical random access channel transmission using the determined grouping.

In accordance with one aspect, an example apparatus is provided comprising: means for indexing physical random access channel resources; means for determining grouping of the physical random access channel resources based, at least partially, upon the indexing; and means for transmitting a physical random access channel transmission using the determined grouping.

In accordance with one aspect, an example non-transitory program storage device readable by an apparatus is provided, tangibly embodying a program of instructions executable with the apparatus for performing operations, the operations comprising: indexing physical random access channel resources; determining grouping of the physical random access channel resources based, at least partially, upon the indexing; and transmitting a physical random access channel transmission using the determined grouping.

According to some aspects, there is provided the subject matter of the independent claims. Some further aspects are provided in subject matter of the dependent claims.

BRIEF DESCRIPTION OF DRAWINGS

The foregoing aspects and other features are explained in the following description, taken in connection with the accompanying drawings, wherein.

DETAILED DESCRIPTION

Figure 1:
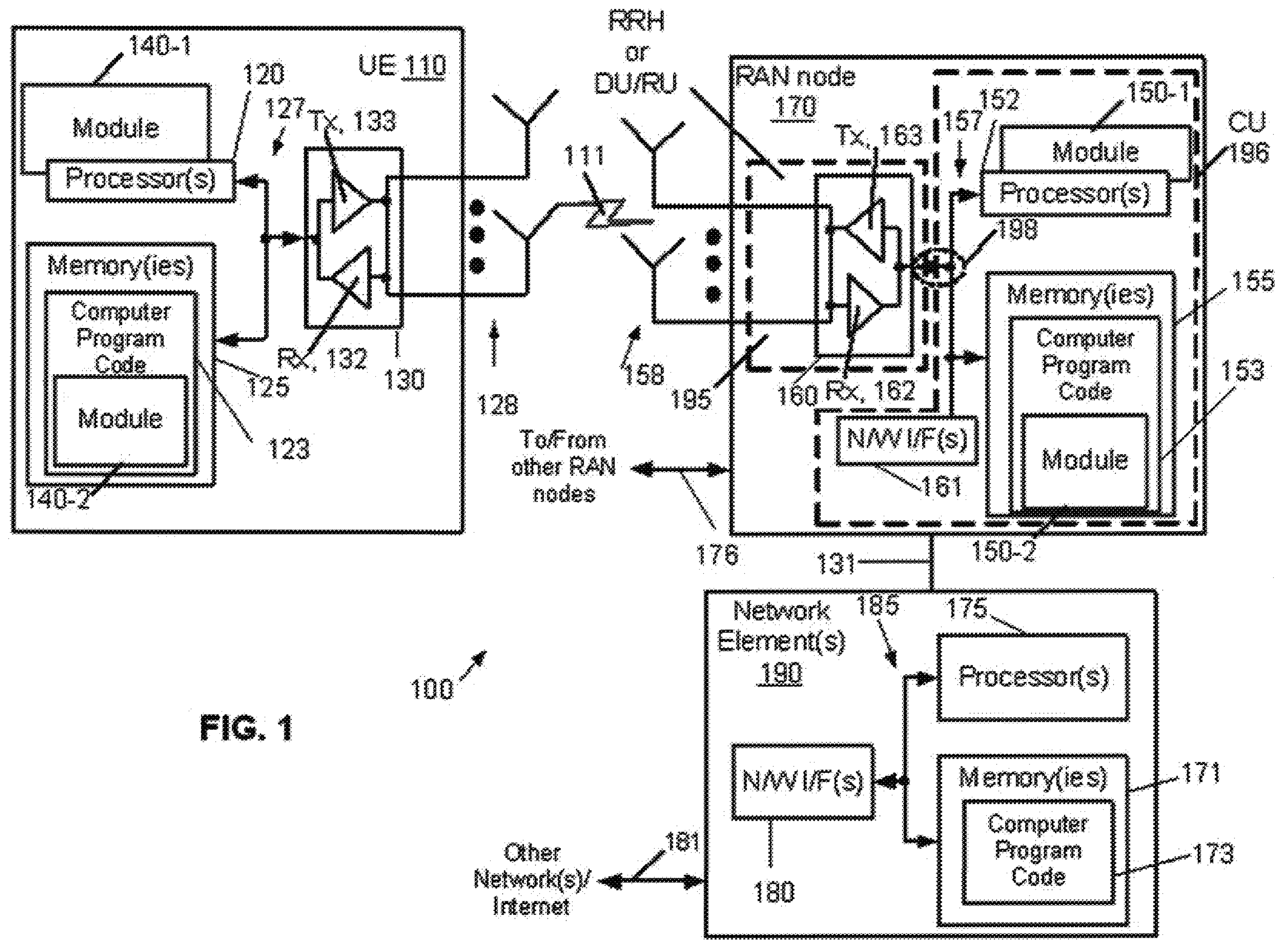
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
ACK acknowledgement
AMF access and mobility management function
AP association period
CRC cyclic redundancy check
C-RNTI cell RNTI
CU central unit
DCI downlink control information
DL downlink
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in
EN-DC
E-UTRA evolved universal terrestrial radio access, i.e., the LTE radio access technology
FDM frequency domain multiplexing
FFS for further study
FR1 frequency range 1
FR2 frequency range 2
gNB (or gNodeB) base station for 5G/NR, i.e., a node providing NR user plane and control plane protocol terminations towards the UE, and connected via the NG interface to the 5GC
I/F interface
LTE 1 long term evolution
MAC medium access control
MIB master information block
MME mobility management entity
Msg1 message 1
Msg2 message 2
ng or NG new generation
ng-eNB or NG-eNB new generation eNB
NR new radio
N/W or NW network
PDCP packet data convergence protocol
PHY physical layer
PRACH physical random access channel
PUCCH physical uplink control channel
PUSCH physical uplink shared channel
RA random access
RACH random access channel
RAN radio access network
RA-RNTI random access-radio network temporary identifier
Rel release
Rel-15 release 15
Rel-16 release 16
Rel-18 release 18
RLC radio link control
RNTI radio network temporary identifier
RO RACH occasion
RRH remote radio head
RRC radio resource control
RU radio unit
Rx receiver
SDAP service data adaptation protocol
SFN system frame number
SGW serving gateway
SIB system information block
SIB1 system information block 1
SMF session management function
SSB synchronization signal block
SS/PBCH synchronization signal/physical broadcast channel
TC-RNTI temporary C-RNTI
TS technical specification
Tx transmitter
UE user equipment (e.g., a wireless, typically mobile device)
UL uplink
UPF user plane function Turning to FIG. 1, this figure shows a block diagram of one possible and non-limiting example in which the examples may be practiced. A user equipment (UE) 110, radio access network (RAN) node 170, and network element(s) 190 are illustrated. Examples of network equipment, network device, or a network entity might be understood to include, at least part of, a transmission reception point or a cell or a gNB or node for example. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein may be used as a flexible way of managing the indexing of RACH occasions (RO) for RO group determination at a UE based on RO indexing, such as in the case of multiple PRACH transmissions for example. Specifically, a UE may autonomously determine the index of ROs within certain associations period, and use such information for determination of the RO groups for the multiple PRACH transmissions. For example, this may be used to unambiguously find on which ROs to perform PRACH repetitions. In other words, a network configuration from the network is not required. Once the RO numbering/indexing and the RO groups are determined, the UE may transmit PRACH repetitions on one of the determined RO groups.

Figure 2:
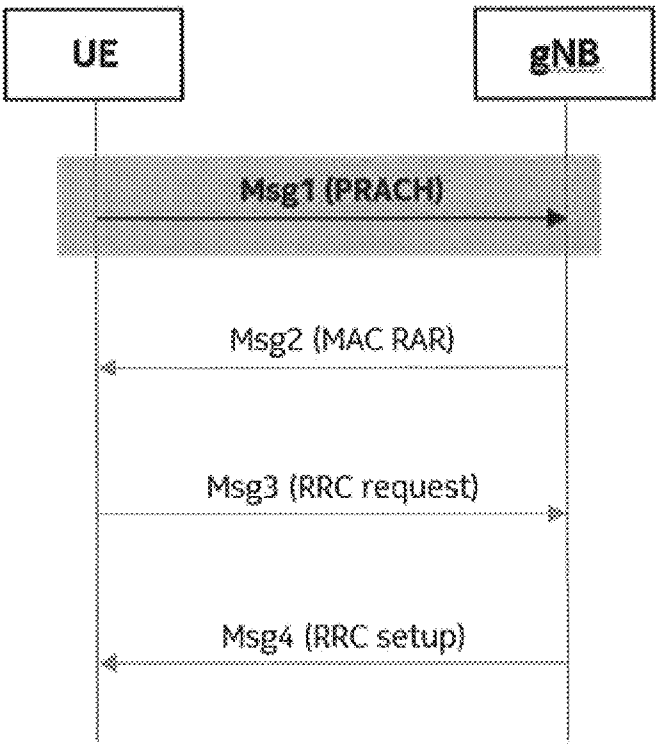
FIG. 2 is a diagram illustrating a 4-step random access channel procedure.

Referring also to FIG. 2, an example of a 4-step RACH procedure is shown. In 5G NR, two contention based random access (CBRA) procedures are supported, namely 4-step RACH (Rel-15) and 2-step RACH (Rel-16). Reference to the 4-step RACH procedure and FIG. 2 is merely for illustration purposes and simplicity. Features as described herein are equally applicable to the 2-step RACH procedure. As shown in FIG. 2, the 4-step RACH procedure can be summarized as follows:

1. Msg1 (a.k.a. PRACH): The UE sends a specific preamble to the gNB via physical random-access channel (PRACH) using a specific resource called RACH occasion or PRACH occasion (RO).
2. Msg2 (a.k.a. RAR): The gNB replies with a random-access response (RAR) message, which includes the detected preamble ID, the time-advance command, a TC-RNTI, and UL grant for the transmission of Msg3 on PUSCH.
3. Msg3 (a.k.a. RRC request): The UE responds to Msg2 over the scheduled PUSCH with an ID for contention resolution.
4. Msg4 (a.k.a. RRC setup): The gNB transmits the contention resolution message with the contention-resolution ID.

Upon reception of Msg4, the UE sends an ACK on a PUCCH if its contention-resolution ID is carried by Msg4. This completes the 4-step RACH. It is worth noting that prior to Msg1, there is also a preliminary step of sending and receiving the synchronization signal block (SSB), i.e., DL beam sweeping, which is not formally part of the RACH procedure. As a result of this preliminary step, the UE selects the index of the preferred SSB beam and decodes the associated PBCH for MIB, SIB and so on. This index is also used by UE to identify a suitable RO for the preamble transmission (Msg1), according to the SSB-to-RO mapping implicitly conveyed by SIB1.

2-step RACH is similar to 4-step RACH noted above, but Msg1 and Msg3 are combined in a MsgA and sent out without waiting for feedback from the UE in between (traditionally Msg2). Similarly, the gNB combines Msg2 and Msg4 into MsgB. It is straightforward to apply features described herein for Msg1, to the preamble/Msg1 part of MsgA.

Configuration of RACH Occasions (ROs)

In Time Domain:

The time-domain resource for RACH occasions (ROs) is RRC configured by prach-ConfigurationIndex (in rach-ConfigGeneric), which acts as an indicator to a row of a table specified in TS 38.211 (clause 6.3.3.2). With the parameters indicated by prach-ConfigurationIndex, the UE determines the preamble format for PRACH and applies the procedure specified in TS 38.211 (clause 5.3.2) to find the ROs in time-domain.

Figure 3:
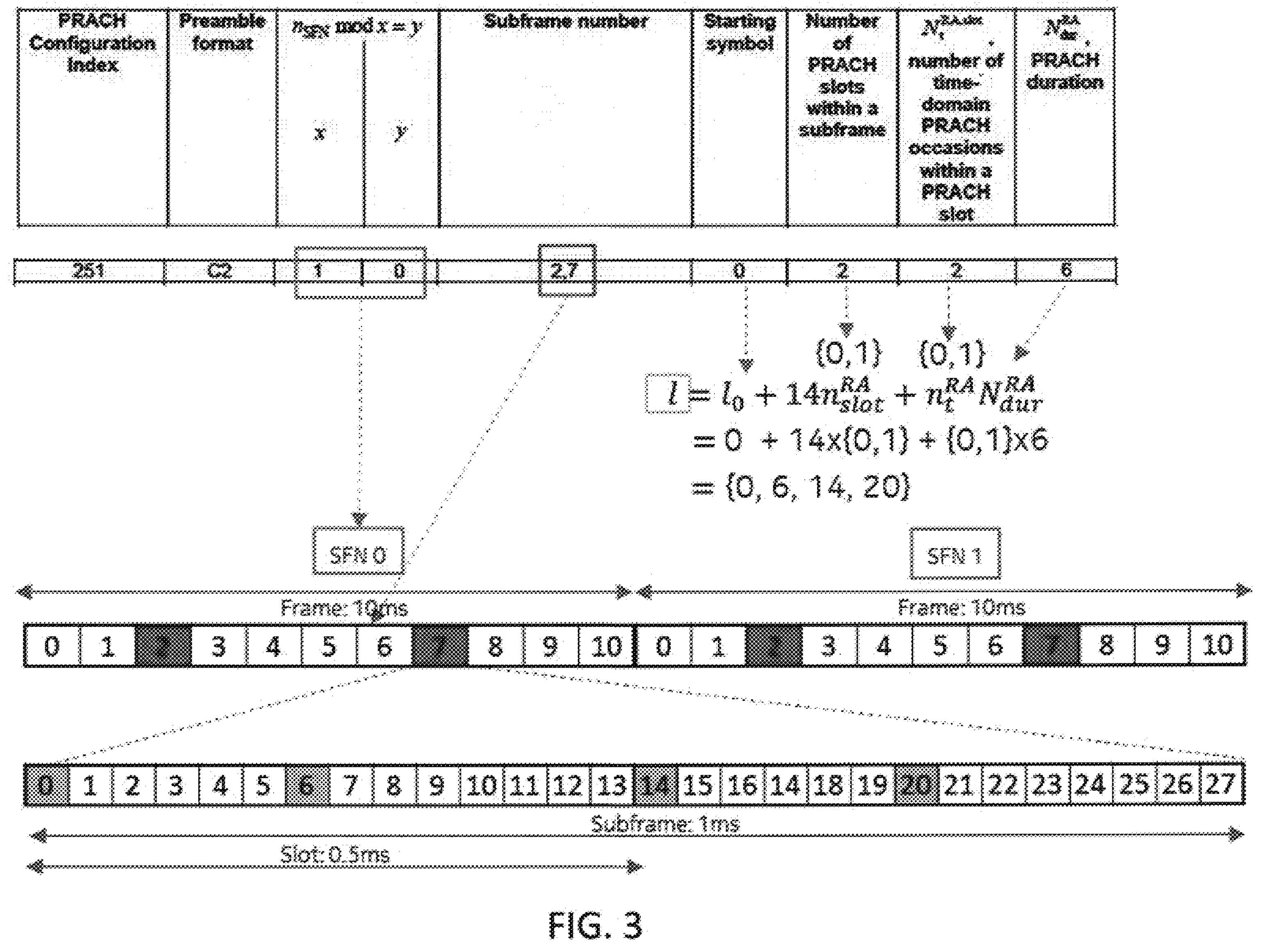
FIG. 3 is a diagram illustrating an example of time-domain resource determination for RACH occasions.

FIG. 3 illustrates an example of time-domain resource determination for RACH occasions, wherein the prach-ConfigurationIndex is 251. With this index indicated, the UE determines the following:

- Preamble format C2 should be used.
- ROs are allocated at the system frame numbers ($n_{SFN}$) that satisfy $n_{SFN}$ mod 1=0 (i.e. all SFN numbers are valid).
- Within each of the determined SFNs, ROs are allocated at subframe number 2 and 7.
- Within each of the determined subframes, the remaining parameters in the considered row indicate that ROs will start at symbol number 0, 6, 14, 20. The symbol number is continuously counted regardless of the number of slots within the subframe, which depends on the sub-carrier spacing configured for PRACH.
- ROs duration is 6 symbols (although the actual duration of the preamble format can be less than that).

Finally, the validity of the determined ROs must be checked. According to TS 38.213 (clause 8.1) an RO is determined as valid, if it is within UL symbols or if it has a sufficient gap after the last SSB/DL symbol in case it is within flexible symbols.

Figure 4:
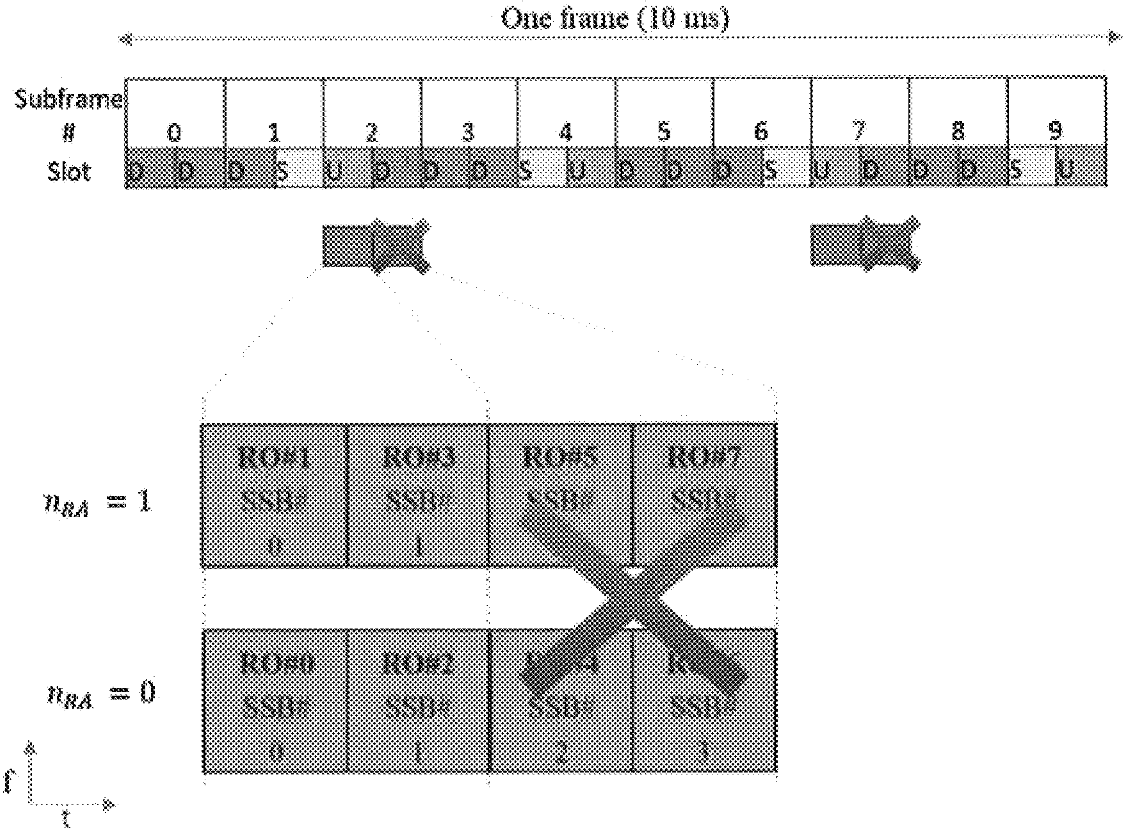
FIG. 4 is a diagram illustrating an example of SSB to RO mapping with prach-ConfigurationIndex 251 and UL/DL configuration DDDSU.

In Frequency Domain:

The parameters msg1-FrequencyStart and msg1-FDM configured in RACH-ConfigGeneric indicate the offset of the lowest RO in frequency domain from the start of the UE uplink bandwidth part and the number of ROs multiplexed in frequency domain for each time instance, respectively. Such ROs are indexed as $n_{RA}\{0,1, \ldots, M-1\}$, where M equals the higher-layer parameter msg1-FDM, and are numbered in increasing order within the UE uplink bandwidth part, starting from the lowest frequency. $n_{RA}$ is the name of the index of the frequencies allocated to RACH occasions for random access usage. Thus, $n_{RA}$ is a form of a random access frequency index. An example of such mapping is also shown in FIG. 4, in the case of msg1-FDM=2.

The number of occupied resource blocks per RO, expressed in number of RBs for PUSCH, is specified in Section 6.3.3.2 of TS 38.211, depending on the configured preamble length and sub-carrier spacings for PRACH and PUSCH.

SSB to RO Mapping:

The mapping of SSB indexes to the determined ROs is fundamental for a UE to understand which ROs are associated to the SSB index selected during the preliminary step before the start of the RACH procedure. The different SSB indexes are beamformed in different directions in the cell. Hence, selection of a wrong SSB index may entail failure of the RACH procedure.

To this purpose, one fundamental parameter ssb-perRACH-OccasionAndCB-PreamblesPerSSB is configured in RACH-ConfigCommon and indicates two information: (i) the number of SSB indexes per RO and (ii) the number of contention-based preambles per SSB index. Once this information is available to a UE, the UE maps the SSB indexes to the time-frequency grid of ROs (determined as described above) in increasing order of frequency resource indices, time resource indices of the ROs within a PRACH slots, and the PRACH slots, sequentially.

FIG. 4 illustrates an example of SSB to RO mapping with prach-ConfigurationIndex 251 and UL/DL configuration DDDSU. Valid ROs are shown in one frame, determined as illustrated in FIG. 3, and further assumes the following additional configuration: DDDSU slot structure, Msg1-FDM=two, and ssb-perRACH-OccasionAndCB-PreamblesPerSSB is one-half. Based on the configuration, two ROs are multiplexed in the frequency domain (Msg1-FDM=two) and any two FDM'd ROs are mapped to the same SSB index (ssb-perRACH-OccasionAndCB-PreamblesPerSSB=1/2).

In relation to the SSB-to-RO mapping, TS 38.213 defines an association period, starting from frame 0, for mapping SSB indexes to PRACH occasions (i.e. ROs) as the smallest value in the set determined by the PRACH configuration period according to Table 8.1-1 (shown below) such that all of the SSB indexes are mapped at least once to the PRACH occasions within the association period. The PRACH configuration period referred to here is determined at the UE based on the configured PRACH configuration index. In other words, an association period is a period of time wherein all SSB indexes are mapped to at least one RO.

TABLE 8.1-1

Mapping between PRACH configuration period and SS/PBCH block to PRACH occasion association period

| PRACH configuration period (msec) | Association period (number of PRACH configuration periods) |
|---|---|
| 10 | (1, 2, 4, 8, 16) |
| 20 | (1, 2, 4, 8) |
| 40 | (1, 2, 4) |
| 80 | (1, 2) |
| 160 | (1) |

PRACH Repetitions in Rel-18

PRACH repetitions will be specified for 5G NR in Rel-18. The concept of RO groups was introduced, wherein with RO group it is intended a group of ROs where a UE transmits multiple PRACH transmissions (or also referred to as PRACH repetitions). Details of RO groups, however, are still being discussed in 3GPP. Features as described herein may be used to provide methods for determination of RO indexing at the UE for generation of the RO groups.

RO groups are being defined in 3GPP RANI to allow a gNB to know with certainty on which ROs a UE is transmitting multiple PRACH transmissions and blindly combine the multiple PRACH transmissions. For that reason, as disclosed herein, the RO counting method for RO group generation for multi-PRACH transmission should be common among UEs in a cell. If the RO counting method is different among UEs in a cell, the first PRACH and the last PRACH transmission can be different among UEs, which makes impossible to have a combined detection over the multi-PRACH transmission at gNB. However, the RO group generation may become cumbersome when restricting the ROs of an RO group to be in different time instances and when considering the possibility of enabling frequency hopping in one RO group. For this reason, features are described herein for the determination of RO indexing at the UE targeting a simplification of the generation of the RO groups.

Example methods are described herein for RO indexing and for RO groups determination at the UE in the case of multiple PRACH transmissions, based on the RO indexing. In particular, an example method is described for a UE to autonomously determine the index of ROs within certain association periods, and use such information for determination of the RO groups for the multiple PRACH transmissions, i.e. to unambiguously find on which ROs to perform PRACH repetitions.

Methods for UE Numbering of PRACH Resources

In one example embodiment, the PRACH resources are PRACH occasions (i.e. ROs), wherein the time and frequency location of the ROs are determined by the UE based on network configuration, and the numbering of the ROs refers to the determination of indexes of the ROs.

In one example embodiment (referred to below as embodiment '1b'), the determination of the indexes is limited to an association period and for ROs mapped to a same SSB index, for ROs with same or different $n_{RA}$

Figure 5:
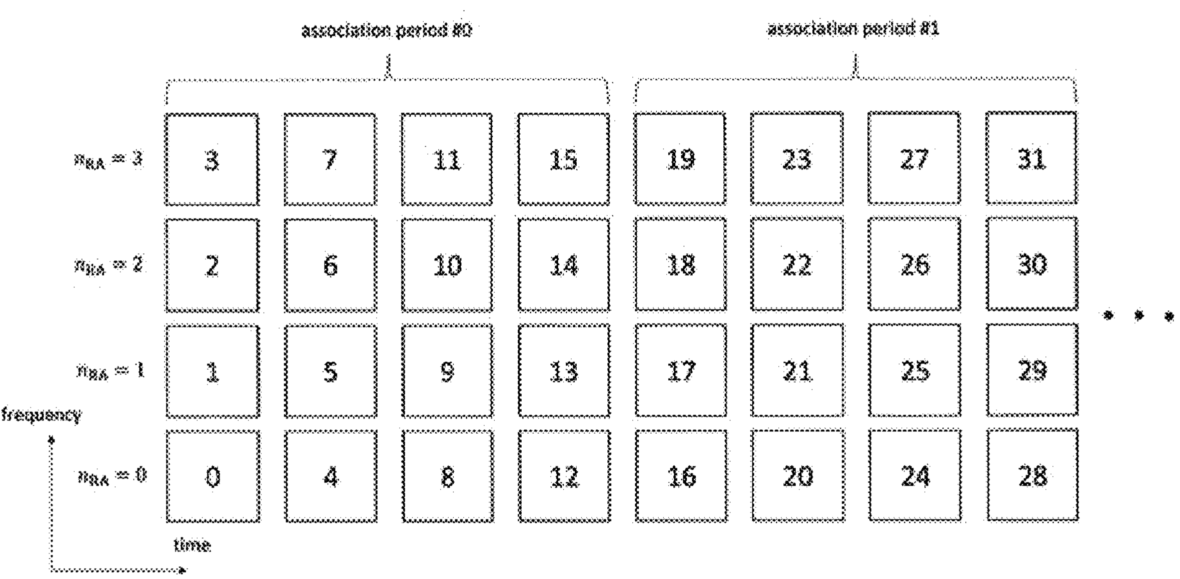
FIG. 5 is a diagram illustrating an example of RO numbering first in frequency and then in time, where each block represents an RO and contains the corresponding RO index.

- If the association period contains N ROs mapped to the same SSB index, the ROs are numbered from 0 to N−1, starting from the first RO of the association period mapped to the SSB index, wherein the first RO is defined as the earliest RO in the association period at the lowest frequency position (i.e. lowest $n_{RA}$). An example of this is shown in FIG. 5 with RO numbers 0, 1, 2, 3 in the left column.
- In one example implementation, as illustrated with FIG. 5, the numbering from 0 to N−1 is done first in frequency (i.e. for frequency multiplexed ROs) and then in time The numbering from 0 to N−1 may also be further subject to a modulo operation with the number of ROs mapped to a same SSB and multiplexed in frequency domain. For example, if the number of ROs mapped to a same SSB is 2 (i.e. inverse of the value ssb-perRACH-OccasionAndCB-PreamblesPerSSB) and N=4, the numbering of the 4 ROs would be [0, 1, 0, 1].

- In another implementation, the numbering from 0 to N−1 is done first in time and then in frequency.

In one implementation, the numbering from 0 to N−1 is further subject to a modulo operation with the size of the RO group the UE is seeking to create. For example, if the size of the group is 2 and N=4, the numbering of the 4 ROs would be [0, 1, 0, 1].

In one example embodiment (referred to below as embodiment '1c'), the determination of the indexes is limited to an association period and for ROs mapped to a same SSB index, for ROs with same $n_{RA}$ If the association period contains N ROs mapped to the same SSB index and with the same $n_{RA}$, the ROs with same $n_{RA}$ are numbered from 0 to N−1, starting from the first RO of the association period mapped to the SSB index, wherein the first RO is defined as the earliest RO in the association period for a certain $n_{RA}$.

In one implementation, the numbering from 0 to N−1 is done only in time for each frequency position $n_{RA}$.

It is worth highlighting that embodiment '1c' ('ROs with same $n_{RA}$') is not covered by embodiment '1b' ('ROs with same or different $n_{RA}$'), and thus necessary. Indeed, in embodiment '1b' N is defined as the number of ROs mapped to the same SSB index which spans both time and frequency, while in embodiment '1c' N is defined as the number of ROs mapped to the same SSB index which spans only in time. Thus, in the latter case, at different $n_{RA}$'s the numbering needs to start over.

In another example embodiment (referred to below as embodiment '1d'), the determination of the indexes spans multiple association periods for ROs mapped to a same SSB index and with same or different $n_{RA}$ In one implementation of this embodiment, the RO index of an RO is determined with a two-step procedure:

In a first step, the RO index within an association period is determined based on embodiment '1b', and will be referred to as $RO_{idx,AP}$ in the following that spans from 0 to N−1

In a second step, the RO index spanning multiple association periods is determined as $RO_{idx}=RO_{idx,AP}+N\cdot AP$, wherein AP is an index of the association period (determined as by embodiments f. and g.), N is the number of ROs mapped to an SSB index with same or different $n_{RA}$ within an association period, and $RO_{idx,AP}$ is the RO index as determined in the first step.

With such a procedure $M=N\cdot AP_{max}$ ROs are numbered, wherein $AP_{max}$ is the largest index of the association periods.

In one implementation of this embodiment, the M ROs are numbered first in time and then in frequency, wherein the time spans the whole duration of the multiple association periods In one implementation, the numbering from 0 to M−1 is further subject to a modulo operation with the size of the group the UE is seeking to create. For example, if the size of the group is 2 and M=4, the numbering of the 4 ROs would be [0, 1, 0, 1].

In another example embodiment (referred to below as embodiment '1e'), the determination of the indexes spans multiple association periods for ROs mapped to a same SSB index and with same $n_{RA}$ In one implementation of this example embodiment, the RO index of an RO is determined with a two-step procedure:

In a first step, the RO index within an association period for a certain $n_{RA}$ is determined based on embodiment '1c', and will be referred to as $RO_{idx,AP}$ in the following that spans from 0 to N−1

In a second step, the RO index spanning multiple association periods is determined as $RO_{idx}=RO_{idx,AP}+N\cdot AP$, wherein AP is an index of the association period (determined as by embodiments f. and g.), N is the number of ROs mapped to an SSB index with same $n_{RA}$ within an association period, and $RO_{idx,AP}$ is the RO index as determined in the first step.

With such a procedure $M=N\cdot AP_{max}$ ROs are numbered, wherein $AP_{max}$ is the largest index of the association periods.

In another example embodiment, the PRACH resources are association periods (APs), wherein the time span of the AP is determined by the UE based on network configuration and the specifications, and the numbering of the APs refers to the determination of indexes of the APs.

In one example implementation, a set of K APs constitute a reference time period, and the APs are enumerated from 0 to K−1, wherein 0 is the first AP within the reference time period and K−1 is the last AP within the reference time period.

In another example embodiment, the PRACH resources are RO groups, wherein the time span of the RO groups is determined by the UE based on network configuration and the specifications, and the numbering of the RO groups refers to the determination of indexes of the RO groups.

In one example implementation, the time span of a set of R RO groups constitutes a reference time period, and the RO groups are enumerated from 0 to R−1, wherein 0 is the first RO group within the reference time period and R−1 is the last RO group within the reference time period.

In another example embodiment, an APP is defined as a period that includes one or more APs and is determined so that a pattern between PRACH occasions and SS/PBCH block indexes repeats at most every 160 msec. In other words, the time span of an APP is a time duration during which a same pattern between ROs and SSB indexes can be found. Moreover, the numbering of the APPs refers to the determination of indexes of the APPs.

In one example implementation, a set of P APPs constitute a reference time period, and the association pattern periods are enumerated from 0 to P−1, wherein 0 is the first APP within the reference time period and P−1 is the last APP within the reference time period.

In another example embodiment, all ROs associated with a same SSB index in a same time instance share a same RO index and the numbering is done in time domain.

With features as described herein, the UE determines RO numbering/indexing (such as with the example methods described above and further described with the examples below), the UE then groups the ROs into an RO group, and then the UE provides transmission of the multiple PRACH transmissions in the determined ROs of the determined RO group.

In one example embodiment, an RO group is determined as a sequence of ROs with consecutive indexes at a same $n_{RA}$ value.

In another example embodiment, an RO group is determined as a sequence of ROs with consecutive indexes at different $n_{RA}$ values.

In another example embodiment, an RO group is determined as a sequence of ROs with non-consecutive indexes.

In another example embodiment, an RO group is determined as a sequence of ROs with same indexes.

In another example embodiment, an RO group is determined as a sequence of ROs in a sequence of association periods with consecutive indexes.

The UE may be configured to use one group or multiple groups. For the time-frequency grid provided in the examples below, the UE may determine all the RO groups within the grid. Then the UE may choose the group to be used to send its PRACH repetitions. So, in the example where there is more than one group, the UE may only transmit in regard to one selected group at a time even though multiple grouping may be available for use. Although the UE may be able to report details of a RO group or grouping selection to the gNB, the UE does not need to communicate any details to gNB. This is because the gNB may be able to derive a RO group itself. The way for a gNB to derive a RO groups itself may, for example, be described in a specification for the UE and/or a specification for the gNB.

The above list describes several ways to generate RO groups. One or more of these methods could be used or, alternatively or additionally, another method might be used. In one example the UE may be configured to only use one method. In another example the UE may be configured to select one of the methods from a group of methods. The selection process may be in a predetermined way, i.e., according to some rules. As one example, if RO indexing is done in a certain way, then the UE may select a predetermined certain RO grouping method; otherwise, the UE may select another predetermined grouping method. These are merely some examples and should not be considered as limiting.

Examples

Further examples are described below for another description of the methods proposed above, which focus on UE numbering of PRACH resources and UE determination of ROs belonging to RO groups. Moreover, a number of multiplexed ROs Msg1-FDM=4 is considered. Four (4) steps are described below in these examples.

Step 1: the UE is configured based upon a configuration from a gNB of the PRACH parameters and time and frequency location of the ROs.

Figure 6:
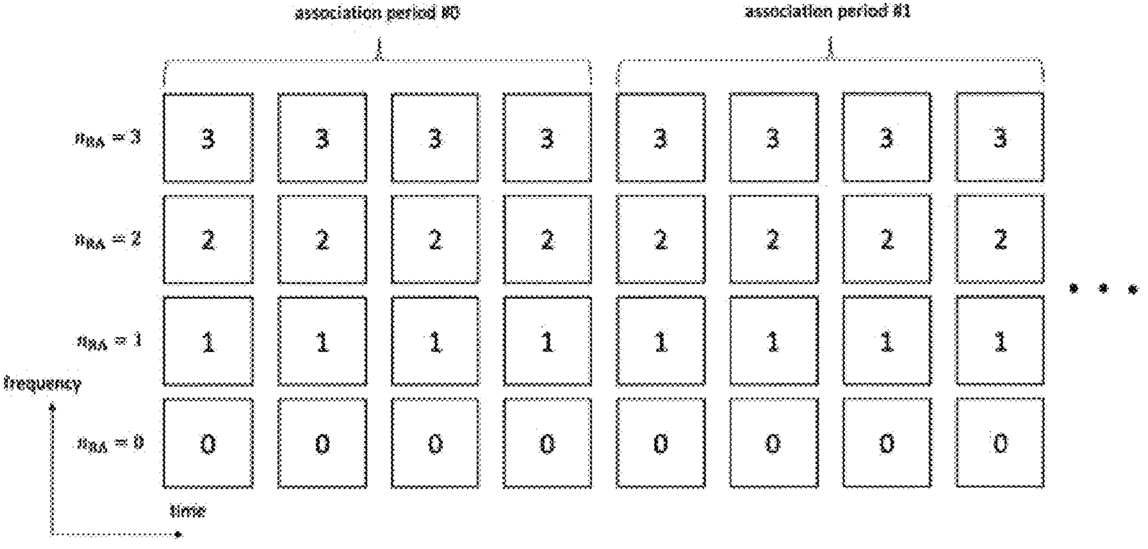
FIG. 6 is a diagram illustrating an example of RO numbering first in frequency (with modulo operation) and then in time, where each block represents an RO and contains the corresponding RO index.
Figure 7:
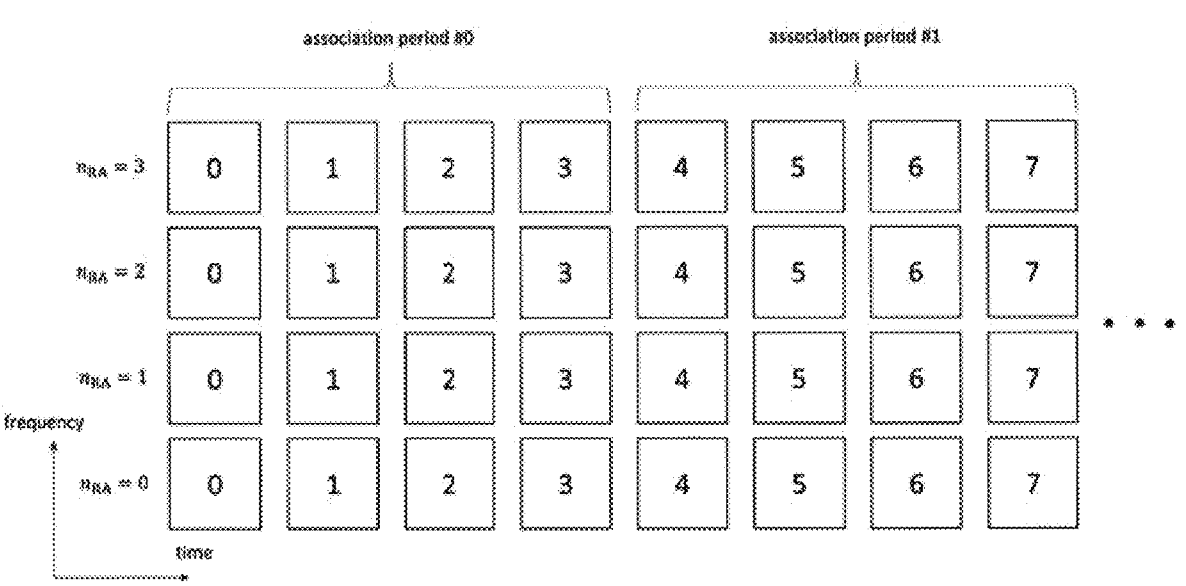
FIG. 7 is a diagram illustrating an example of RO numbering in time, where each block represents an RO and contains the corresponding RO index.

Step 2: the UE determines the numbering of PRACH resources, i.e., it determines the RO indexes of valid ROs with same SSB index.

a. In a first example we refer to embodiment ‘1b’ (single association period and ROs with same or different $n_{RA}$) for the case of numbering done first in frequency and then in time. The RO numbering is shown in FIG. 5 left half, with reference to the association period #0. As seen, ROs are numbered first in frequency and then in time from 0 to N−1, where N=16.

b. As a second example, the first example is extended to the case of multiple association periods (embodiment ‘1d’). The RO numbering is again shown in FIG. 5, with reference to association periods #0, #1, and possible following consecutive association periods. For association period #0, the ROs numbering is the same as the previous example. For association period #1, the RO indexes are determined as $RO_{idx}=RO_{idx,AP}+N\cdot AP$, where N=16, AP=1, since we are number association period #1, and $RO_{idx,AP}$ is the RO index defined for association period #0.

c. In a third example we refer again to embodiment ‘1b’ (single association period and ROs with same or different $n_{RA}$) for the case of numbering done first in frequency and then in time, where a modulo operation with the number of Ros mapped to a same SSB and multiplexed in frequency domain is performed. The RO numbering is shown in FIG. 6 left half, with reference to the association period #0. As seen, ROs are numbered starting from the configuration of Step ‘2a’, where a further modulo 4 operation is performed on RO indexes.

d. As a fourth example, we extend the first example to the case of multiple association periods (embodiment ‘1d’). The RO numbering is again shown in 6, with reference to association periods #0, #1, and possible following consecutive association periods. In this case, ROs are numbered starting from the configuration of Step ‘2b’, where a further modulo 4 operation is performed on RO indexes.

e. In a fifth example we consider embodiment ‘1c’ (single association period and ROs with same $n_{RA}$). The RO numbering is shown in FIG. 7 left half, with reference to the association period #0. As seen, the ROs are numbered in time from 0 to 3, since N=4 (number of ROs in time domain for a certain $n_{RA}$). Moreover, the numbering is the same for the different $n_{RA}$, which is the case for this embodiment.

f. Finally, as a sixth example, we extend the previous example to the case of multiple association periods (embodiment ‘1e’). The RO numbering is again shown in FIG. 7, with reference to association periods #0, #1, and possible following consecutive association periods. For association periods #0, the ROs numbering is the same as the previous example. For association period #1, the RO indexes are determined as $RO_{idx}=RO_{idx,AP}+N\cdot AP$, where N=4, AP=1, since we are number association period #1, and $RO_{idx,AP}$ is the RO index defined for association period #0.

The above described methods are merely examples. Other methods could be used to determine the RO indexing/numbers. Using the methods proposed above, other examples of RO numbering could be derived.

Step 3: the UE determines the ROs belonging to RO groups based on the RO numbering derived in Step 2 (these may be the RO indexes where the UE may perform its PRACH repetitions).

a. As an example using RO numbering determined in Step ‘2a’, a possible RO group may be determined as a sequence of non-consecutive increasing RO indexes with same $n_{RA}$, e.g., {0, 4, 8, 12} (4 repetitions in this case) (the RO numbers in part of the line $n_{RA}=0$ shown in FIG. 5; the part corresponding to association period #0).

b. As an example using RO numbering determined in Step ‘2b’, a possible RO group may be determined as a sequence of non-consecutive increasing RO indexes with same $n_{RA}$, e.g., {0, 4, 8, 12, 16, 20, 24, 28} (8 repetitions in this case) (the RO numbers in the line $N_{RA}=0$ shown in FIG. 5; the corresponding to both association period #0 and association period #1).

c. As an example using RO numbering determined in Step ‘2c’, a possible RO group may be determined as a sequence of ROs with same indexes, e.g., {0, 0, 0, 0} (4 repetitions in this case) (the RO numbers in part of the line $n_{RA}=0$ shown in FIG. 6; the part corresponding to association period #0).

d. As an example using RO numbering determined in Step ‘2d’, a possible RO group may be determined as a sequence of ROs with same indexes, e.g., {0, 0, 0, 0, 0, 0, 0, 0} (8 repetitions in this case) (the RO numbers in the line $n_{RA}$=0 shown in FIG. 6; the corresponding to both association period #0 and association period #1).

e. As an example using RO numbering determined in Step '2e', a possible RO group may be {0,1,2,3} (4 repetitions in this case) (the RO numbers in part of the line $n_{RA}$=0 shown in FIG. 7; the part corresponding to association period #0).

f. As an example using RO numbering determined in Step '2f', a possible RO group may be {0,1,2,3,4,5} (6 repetitions in this case). (RO numbers from line $n_{RA}$=0 shown in FIG. 7; corresponding to both association period #0 and association period #1) However, in this case for only 6 repetitions; less than the total of 8 possible RO numbers in the line $n_{RA}$ of both association periods #0 and #1.

Using the above RO numbering, other examples of RO groups creation according to the above could be derived.

Features as described herein may be used to provide a UE which is able to autonomously determines numbering of PRACH resources, i.e. determines the RO indexes of valid ROs with same SSB index. The numbering of PRACH resources may refer to association period, e.g. within a certain association period. The UE may, thus, determine the ROs belonging to RO groups based on the RO numbering, for performing PRACH repetitions. An example method for determination of RO indexing at the UE for generation of the RO groups may be provided with numbering of PRACH resources, with reference to association period, and determining ROs belonging to RO groups based on the numbering. Features may be used regarding how to determine RO indexing at the UE in order to simplify generation of the RO groups. This avoids the RO group generation becoming cumbersome when restricting the ROs of an RO group to be in different time instances and when considering the possibility of enabling frequency hopping in one RO group. Features may be provided with enable a UE to autonomously determine the index of ROs within certain associations period, and use such information for determination of the RO groups for the multiple PRACH transmissions, i.e. to unambiguously find on which ROs to perform PRACH repetitions. Because the UE may operate autonomously, network configuration is not required. Once the RO numbering/indexing and RO groups are determined, the UE may transmit the PRACH repetitions on one of the determined RO groups.

With features as described herein, numerology may be used for RO groups which may have direct standardization impact if agreed within RAN 1. Features may be integrated into standards such as, for example, TS 38.213 and TS 38.331.

Figure 8:
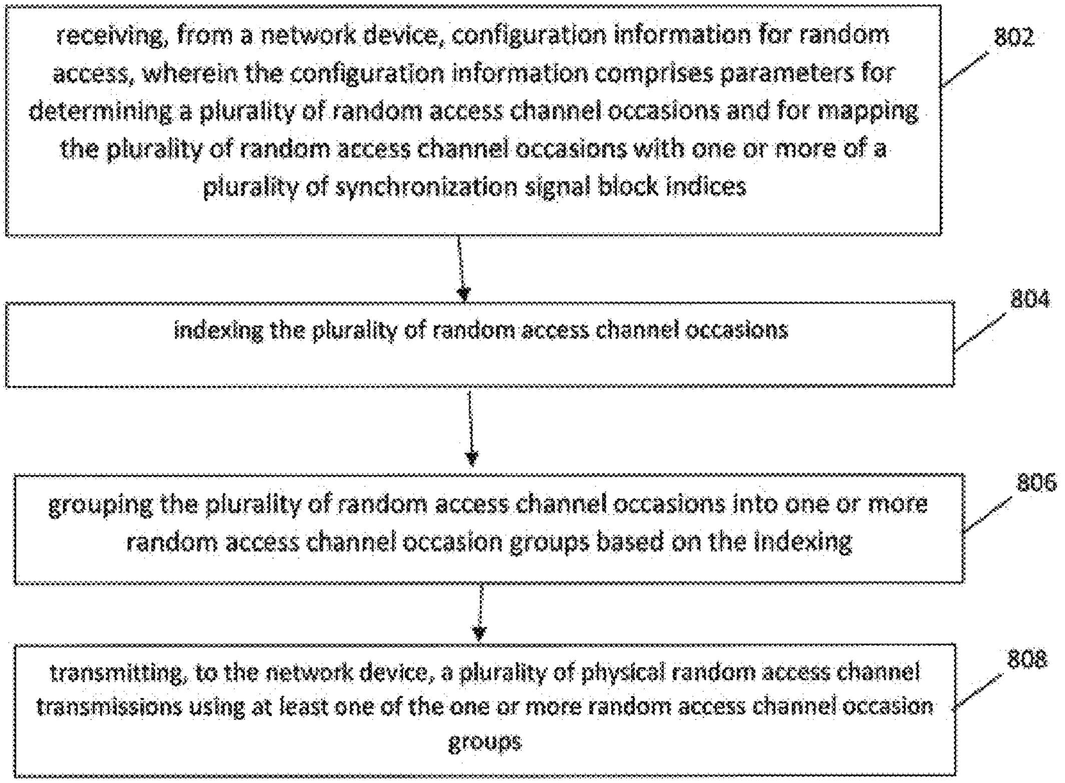
FIG. 8 is a diagram illustrating an example method.

Referring also to FIG. 8, an example method may be provided comprising: receiving, from a network device, configuration information for random access, wherein the configuration information comprises parameters for determining a plurality of random access channel occasions and for mapping the plurality of random access channel occasions with one or more of a plurality of synchronization signal block indices as indicated with block 802; indexing the plurality of random access channel occasions as indicated with block 804; grouping the plurality of random access channel occasions into one or more random access channel occasion groups based on the indexing as indicated with block 806; and transmitting, to the network device, a plurality of physical random access channel transmissions using at least one of the one or more random access channel occasion groups as indicated with block 808.

The method may further comprise determining corresponding time and frequency positions of the plurality of random access channel occasions based on the configuration information. The random access channel occasions may be at a same frequency position. The random access channel occasions may be at different frequency positions. The method may further comprise: sequentially indexing, within an association period, random access channel occasions mapped to a same synchronization signal block index of the plurality of synchronization signal block indices, starting from a first random access channel occasion mapped to the same synchronization signal block index in the association period, wherein the first random access channel occasion is the earliest random access channel occasion in the association period at the lowest frequency position among the plurality of random access channel occasions. The sequentially indexing may be done first in frequency and then in time. The sequentially indexing may be done first in time and then in frequency. The sequentially indexing may be done only in time for each frequency position of the random access channel occasions. The method may further comprise indexing, across more than one association period, random access channel occasions mapped to a same synchronization signal block index of the plurality of synchronization signal block indices. The random access channel occasions may be at a same frequency position. The random access channel occasions may be at different frequency positions. The method may further comprise determining a time span of the more than one association period based on the configuration information. The association periods may constitute a reference time period; and the association periods are enumerated from 0 to K−1, wherein 0 is the first association period within the reference time period and K−1 is the last association period within the reference time period, K is a positive integer. The random access channel occasions in one random access channel occasion group may be associated with a same synchronization signal block index. The random access channel occasions associated with a same synchronization signal block index, in a same time instance, may share a same random access channel occasion index, and the indexing may be done in time domain. A random access channel occasion group may be determined as a sequence of random access channel occasions with consecutive indexes at a same frequency position. A random access channel occasion group may be determined as a sequence of random access channel occasions with consecutive indexes at different frequency positions. A random access channel occasion group may be determined as a sequence of random access channel occasions with non-consecutive indexes. A random access channel occasion group may be determined as a sequence of random access channel occasions with a same index. A random access channel occasion group may be determined as a sequence of random access channel occasions in a sequence of association periods with consecutive indexes.

An example method may be provided comprising: indexing physical random access channel resources; determining grouping of the physical random access channel resources based, at least partially, upon the indexing; and transmitting a physical random access channel transmission using the determined grouping.

The method may further comprise determining the physical random access channel resources, where the random access channel resources comprise physical random access channel occasions. The transmitting of the physical random access channel transmission may comprise a physical random access channel repetition. The transmitting of the physical random access channel transmission may comprise transmitting the physical random access channel transmission multiple times at occasions determined using the determined grouping. The indexing of the physical random access channel resources may comprise indexing relative to at least one association period. The indexing of the physical random access channel resources may comprise indexing relative to occasions mapped to a same synchronization signal block index. The indexing of the physical random access channel resources may comprise starting with an earliest physical random access channel resource in an association period at a lowest frequency position. The indexing of the physical random access channel resources relative to one another may be sequentially accomplished first in relation to frequency of the physical random access channel resource and then in relation to time of the physical random access channel resource. The indexing of the physical random access channel resources relative to one another may be sequentially accomplished first in relation to time of the physical random access channel resource and then in relation to frequency of the physical random access channel resource. The indexing of the physical random access channel resources relative to one another may be sequentially accomplished first in relation to time of the physical random access channel resource and not in relation to frequency of the physical random access channel resource. The indexing of the physical random access channel resources may comprise a multi-step process comprising partially indexing with regard to a first association period and partially indexing with regard to multiple association periods. The indexing of the physical random access channel resources may comprise indexing relative to a sole association period. The indexing of the physical random access channel resources may comprise indexing relative to a random access frequency index. The indexing of the physical random access channel resources may comprise a modulo operation using a size of the group seeking to be created. The determining of the grouping may comprise the group being determined as a sequence of physical random access channel resources with consecutive indexes at a same random access frequency index value. The determining of the grouping may comprise the group being determined as a sequence of physical random access channel resources with consecutive indexes at different random access frequency index values. The determining of the grouping may comprise the group being determined as a sequence of physical random access channel resources with non-consecutive indexes. The determining of the grouping may comprise the group being determined as a sequence of physical random access channel resources with same indexes. The determining of the grouping may comprise the group being determined as a sequence of ROs in a sequence of association periods with consecutive indexes.

An example embodiment may be provided with an apparatus comprising: at least one processor; and at least one non-transitory memory storing instructions that, when executed with the at least one processor, cause the apparatus to perform: receiving, from a network device, configuration information for random access, wherein the configuration information comprises parameters for determining a plurality of random access channel occasions and for mapping the plurality of random access channel occasions with one or more of a plurality of synchronization signal block indices; indexing the plurality of random access channel occasions; grouping the plurality of random access channel occasions into one or more random access channel occasion groups based on the indexing; and transmitting, to the network device, a plurality of physical random access channel transmissions using at least one of the one or more random access channel occasion groups.

The instructions, when executed with the at least one processor, may cause the apparatus to perform: determining corresponding time and frequency positions of the plurality of random access channel occasions based on the configuration information. The random access channel occasions may be at a same frequency position. The random access channel occasions may be at different frequency positions. The instructions, when executed with the at least one processor, may cause the apparatus to perform: sequentially indexing, within an association period, random access channel occasions mapped to a same synchronization signal block index of the plurality of synchronization signal block indices, starting from a first random access channel occasion mapped to the same synchronization signal block index in the association period, wherein the first random access channel occasion is the earliest random access channel occasion in the association period at the lowest frequency position among the plurality of random access channel occasions. The sequentially indexing may be done first in frequency and then in time. The sequentially indexing may be done first in time and then in frequency. The sequentially indexing may be done only in time for each frequency position of the random access channel occasions. The instructions, when executed with the at least one processor, may cause the apparatus to perform: indexing, across more than one association period, random access channel occasions mapped to a same synchronization signal block index of the plurality of synchronization signal block indices. The random access channel occasions may be at a same frequency position. The random access channel occasions may be at different frequency positions. The instructions, when executed with the at least one processor, may cause the apparatus to perform: determining a time span of the more than one association period based on the configuration information. The association periods may constitute a reference time period; and the association periods may be enumerated from 0 to K−1, wherein 0 is the first association period within the reference time period and K−1 is the last association period within the reference time period, K is a positive integer. Random access channel occasions in one random access channel occasion group may be associated with a same synchronization signal block index. Random access channel occasions associated with a same synchronization signal block index, in a same time instance, may share a same random access channel occasion index, and the indexing may be done in time domain. A random access channel occasion group may be determined as a sequence of random access channel occasions with consecutive indexes at a same frequency position. A random access channel occasion group may be determined as a sequence of random access channel occasions with consecutive indexes at different frequency positions. A random access channel occasion group may be determined as a sequence of random access channel occasions with non-consecutive indexes. A random access channel occasion group may be determined as a sequence of random access channel occasions with a same index. A random access channel occasion group may be determined as a sequence of random access channel occasions in a sequence of association periods with consecutive indexes.

An example embodiment may be provided with an apparatus comprising: means for receiving, from a network device, configuration information for random access, wherein the configuration information comprises parameters for determining a plurality of random access channel occasions and for mapping the plurality of random access channel occasions with one or more of a plurality of synchronization signal block indices; means for indexing the plurality of random access channel occasions; means for grouping the plurality of random access channel occasions into one or more random access channel occasion groups based on the indexing; and means for transmitting, to the network device, a plurality of physical random access channel transmissions using at least one of the one or more random access channel occasion groups.

An example embodiment may be provided with a non-transitory program storage device readable by an apparatus, tangibly embodying a program of instructions executable with the apparatus for performing operations, the operations comprising: receiving, from a network device, configuration information for random access, wherein the configuration information comprises parameters for determining a plurality of random access channel occasions and for mapping the plurality of random access channel occasions with one or more of a plurality of synchronization signal block indices; indexing the plurality of random access channel occasions; grouping the plurality of random access channel occasions into one or more random access channel occasion groups based on the indexing; and transmitting, to the network device, a plurality of physical random access channel transmissions using at least one of the one or more random access channel occasion groups.

An example embodiment may be provided with an apparatus comprising: at least one processor; and at least one non-transitory memory storing instructions that, when executed with the at least one processor, cause the apparatus to perform: indexing physical random access channel resources; determining grouping of the physical random access channel resources based, at least partially, upon the indexing; and transmitting a physical random access channel transmission using the determined grouping.

An example embodiment may be provided with an apparatus comprising: means for indexing physical random access channel resources; means for determining grouping of the physical random access channel resources based, at least partially, upon the indexing; and means for transmitting a physical random access channel transmission using the determined grouping.

An example embodiment may be provided with a non-transitory program storage device readable by an apparatus, tangibly embodying a program of instructions executable with the apparatus for performing operations, the operations comprising: indexing physical random access channel resources; determining grouping of the physical random access channel resources based, at least partially, upon the indexing; and transmitting a physical random access channel transmission using the determined grouping.

An example may be provided with a method comprising: receiving, from a network device, configuration information for random access, wherein the configuration information comprises a plurality of synchronization signal block indices and a plurality of random access channel occasions each associated with one or more of the plurality of synchronization signal block indices within corresponding one or more association periods; indexing the plurality of random access channel occasions based on the corresponding association periods; grouping the plurality of random access channel occasions into one or more random access channel occasion groups based on the indexing; and transmitting, to the network device, a plurality of physical random access channel transmissions using at least one of the one or more random access channel occasion groups.

Some of the examples above mention a plurality of synchronization signal block indices. It should be noted that SSB indices may be referred to as configuration information. SSB is transmitted to a UE carrying synchronization signal and PBCH, and the UE detects its index.

Attached hereto is an Appendix which forms part of this provisional patent application. The Appendix describes an example of how features may be included with future 3GPP standards. This is merely an example and should not be considered as limiting.

The term "non-transitory," as used herein, is a limitation of the medium itself (i.e., tangible, not a signal) as opposed to a limitation on data storage persistency (e.g., RAM vs. ROM).

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
(i) a combination of analog and/or digital hardware circuit (s) with software/firmware and
(ii) any portions of hardware processor(s) with software (including digital signal processor(s)), software, and memory (ies) that work together to cause an apparatus, such as a mobile phone or server, to perform various functions) and
(iii) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:

receiving, from a network device, configuration information for random access, wherein the configuration information comprises parameters for determining a plurality of random access channel occasions and for mapping the plurality of random access channel occasions with one or more of a plurality of synchronization signal block indices;

determining corresponding time and frequency positions of the plurality of random access channel occasions based on the configuration information, wherein the random access channel occasions are at a same frequency position;

sequentially indexing, across more than one association period, a set of the random access channel occasions mapped to a same synchronization signal block index of the plurality of synchronization signal block indices, starting from a first random access channel occasion mapped to the same synchronization signal block index in a first association period of the more than one association period, wherein the first random access channel occasion is an earliest random access channel occasion in the first association period at a lowest frequency position among the plurality of random access channel occasions, wherein the sequentially indexing is done only in time for each frequency position of the random access channel occasions, wherein the more than one association periods constitute a reference time period, and wherein the more than one association periods are enumerated from 0 to K−1, wherein 0 is the first association period within the reference time period and K−1 is a last association period within the reference time period and K is a positive integer, and wherein random access channel occasions associated with a same synchronization signal block index, in a same time instance, share a same random access channel occasion index, and the indexing is done in time domain;

grouping the plurality of random access channel occasions into one or more random access channel occasion groups based on the indexing; and transmitting, to the network device, a plurality of physical random access channel transmissions using at least one of the one or more random access channel occasion groups.

2. The method of claim 1, wherein the random access channel occasion group is determined as a sequence of random access channel occasions with consecutive indexes at a same frequency position.

3. The method of claim 1, wherein the random access channel occasion group is determined as a sequence of random access channel occasions with consecutive indexes at different frequency positions.

4. The method of claim 1, wherein the random access channel occasion group is determined as a sequence of random access channel occasions with non-consecutive indexes.

5. The method of claim 1, wherein the random access channel occasion group is determined as a sequence of random access channel occasions with a same index.

6. The method of claim 1, wherein the random access channel occasion group is determined as a sequence of random access channel occasions in a sequence of association periods with consecutive indexes.

7. The method of claim 6, further comprising transmitting to only one selected group from the one or more random access channel groups even though a plurality of random access channel groups are available for use.

8. The system of claim 1, wherein the random access channel occasion group is determined as a sequence of random access channel occasions in a sequence of association periods with consecutive indexes.

9. The system of claim 8, wherein the computer-executable instructions further cause the processor to transmit to only one selected group from the one or more random access channel groups even though a plurality of random access channel groups are available for use.

10. A system comprising:

an apparatus;

a processor; and a non-transitory computer-readable medium comprising computer executable instructions that, when executed by the processor, cause the processor to perform the following operations:

receiving, from a network device, configuration information for random access, wherein the configuration information comprises parameters for determining a plurality of random access channel occasions and for mapping the plurality of random access channel occasions with one or more of a plurality of synchronization signal block indices;

determining corresponding time and frequency positions of the plurality of random access channel occasions based on the configuration information, wherein the random access channel occasions are at a same frequency position;

sequentially indexing, across more than one association period, a set of the random access channel occasions mapped to a same synchronization signal block index of the plurality of synchronization signal block indices, starting from a first random access channel occasion mapped to the same synchronization signal block index in a first association period of the more than one association period, wherein the first random access channel occasion is an earliest random access channel occasion in the first association period at a lowest frequency position among the plurality of random access channel occasions, wherein the sequentially indexing is done only in time for each frequency position of the random access channel occasions, wherein the more than one association periods constitute a reference time period, and wherein the more than one association periods are enumerated from 0 to K−1, wherein 0 is the first association period within the reference time period and K−1 is a last association period within the reference time period and K is a positive integer, and wherein random access channel occasions associated with a same synchronization signal block index, in a same time instance, share a same random access channel occasion index, and the indexing is done in time domain;

grouping the plurality of random access channel occasions into one or more random access channel occasion groups based on the indexing; and transmitting, to the network device, a plurality of physical random access channel transmissions using at least one of the one or more random access channel occasion groups.

11. The system of claim 10, wherein the random access channel occasion group is determined as a sequence of random access channel occasions with consecutive indexes at a same frequency position.

12. The system of claim 10, wherein the random access channel occasion group is determined as a sequence of random access channel occasions with consecutive indexes at different frequency positions.

13. The system of claim 10, wherein the random access channel occasion group is determined as a sequence of random access channel occasions with non-consecutive indexes.

14. The system of claim 10, wherein the random access channel occasion group is determined as a sequence of random access channel occasions with a same index.

15. An apparatus comprising:

a processor; and a non-transitory computer-readable medium comprising computer executable instructions that, when executed by the processor, cause the processor to perform the following operations:

receiving, from a network device, configuration information for random access, wherein the configuration information comprises parameters for determining a plurality of random access channel occasions and for mapping the plurality of random access channel occasions with one or more of a plurality of synchronization signal block indices;

determining corresponding time and frequency positions of the plurality of random access channel occasions based on the configuration information, wherein the random access channel occasions are at a same frequency position;

sequentially indexing, across more than one association period, a set of the random access channel occasions mapped to a same synchronization signal block index of the plurality of synchronization signal block indices, starting from a first random access channel occasion mapped to the same synchronization signal block index in a first association period of the more than one association period, wherein the first random access channel occasion is an earliest random access channel occasion in the first association period at a lowest frequency position among the plurality of random access channel occasions, wherein the sequentially indexing is done only in time for each frequency position of the random access channel occasions, wherein the more than one association periods constitute a reference time period, and wherein the more than one association periods are enumerated from 0 to K−1, wherein 0 is the first association period within the reference time period and K−1 is a last association period within the reference time period and K is a positive integer, and wherein random access channel occasions associated with a same synchronization signal block index, in a same time instance, share a same random access channel occasion index, and the indexing is done in time domain;

grouping the plurality of random access channel occasions into one or more random access channel occasion groups based on the indexing; and transmitting, to the network device, a plurality of physical random access channel transmissions using at least one of the one or more random access channel occasion groups.

16. The apparatus of claim 15, wherein the random access channel occasion group is determined as a sequence of random access channel occasions with consecutive indexes at a same frequency position or at different frequency positions.

17. The apparatus of claim 15, wherein the random access channel occasion group is determined as a sequence of random access channel occasions with non-consecutive indexes.

18. The apparatus of claim 15, wherein the random access channel occasion group is determined as a sequence of random access channel occasions with a same index.

19. The apparatus of claim 18, wherein the computer-executable instructions further cause the processor to transmit to only one selected group from the one or more random access channel groups even though a plurality of random access channel groups are available for use.

20. The apparatus of claim 15, wherein the random access channel occasion group is determined as a sequence of random access channel occasions in a sequence of association periods with consecutive indexes.

* * * * *